(12) United States Patent
Umrethia et al.

(10) Patent No.: US 12,496,291 B1
(45) Date of Patent: Dec. 16, 2025

(54) READY-TO-USE NON-AQUEOUS ORAL SOLUTION OF LOSARTAN

(71) Applicant: Liqmeds Worldwide Limited, Weedon (GB)

(72) Inventors: Manish Umrethia, Ahmedabad (IN); Chintan Pansara, Ahmedabad (IN)

(73) Assignee: LIQMEDS WORLDWIDE LIMITED, Weedon (GB)

( * ) Notice: Subject to any disclaimer, the term of this patent is extended or adjusted under 35 U.S.C. 154(b) by 0 days.

(21) Appl. No.: 19/016,312

(22) Filed: Jan. 10, 2025

(30) Foreign Application Priority Data

Jul. 29, 2024 (IN) .............. 202421057312

(51) Int. Cl.
| | |
|---|---|
| *A01N 43/00* | (2006.01) |
| *A01N 43/46* | (2006.01) |
| *A61K 9/08* | (2006.01) |
| *A61K 31/4178* | (2006.01) |
| *A61K 31/55* | (2006.01) |
| *A61K 47/10* | (2017.01) |
| *A61K 47/36* | (2006.01) |

(52) U.S. Cl.
CPC ............ *A61K 31/4178* (2013.01); *A61K 9/08* (2013.01); *A61K 47/10* (2013.01); *A61K 47/36* (2013.01)

(58) Field of Classification Search
None
See application file for complete search history.

(56) References Cited

U.S. PATENT DOCUMENTS

2007/0026026 A1* 2/2007 Delmarre ............ A61K 9/0095
514/381

FOREIGN PATENT DOCUMENTS

| | | |
|---|---|---|
| WO | 2009/112800 A1 | 9/2009 |
| WO | 2022/076746 A1 | 4/2022 |

OTHER PUBLICATIONS

Lisa Foley et al., "Investigation of the Physical, Chemical and Microbiological Stability of Losartan Potassium 5 mg/ml Extemporaneous Oral Liquid Suspension", Molecules (2021), 26(2), 301: 9 pp.
Mohamed Rahamathulla et al., "Design and Evaluation of Losartan Potassium Effervescent Floating Matrix Tablets: In Vivo X-ray Imaging and Pharmacokinetic Studies in Albino Rabbits", Polymers (2021) 13(20), 3476: 16 pp.
COZAAR® (Losartan Potassium) Tablets, US Prescribing Information, Organon & Co. (2021): 19 pp.
COZAAR® (Losartan Potassium) 2.5 mg-ml Powder and Solvent for Oral Suspension, UK Prescribing Information, Merck Sharp and Dohme Limited, Jun. 2019, 22 pp.
Raymond C Rowe et al. (Edited by), "Handbook of Pharmaceutical Excipients," 6th Edition (2019), 13 pp.
ORA-PLUS®, Oral Suspending Vehicle, product information, Paddock Laboratories, Inc. (2010), 2 pp.
Ora-Sweet® SF, Flavored Sugar-Free Syrup Vehicle, product information, Paddock Laboratories, Inc. (2010), 2 pp.
Remington's: The Science and Practice of Pharmacy, Chapter 16 (in part) Solutions of Phase Equilibria, pp. 211-212, reporting that freely soluble is a descriptive term for solubility where 1 part of solute is soluble in 1-10 parts of solvent, 4 p.

* cited by examiner

*Primary Examiner* — Layla Soroush
(74) *Attorney, Agent, or Firm* — Merchant & Gould P.C.; Daniel R. Evans; Jenna L. Logsdon

(57) ABSTRACT

Disclosed herein is a ready-to-use, non-aqueous oral solution of losartan. Also disclosed herein is a method of preparing a ready-to-use, non-aqueous oral solution of losartan and its method of use.

10 Claims, No Drawings

READY-TO-USE NON-AQUEOUS ORAL SOLUTION OF LOSARTAN

RELATED APPLICATION

This application claims priority to Indian Patent Application No. IN202421057312, filed on Jul. 29, 2024, the subject matter of which is incorporated by reference.

FIELD

Disclosed herein is a ready-to-use, non-aqueous oral solution of losartan. Also disclosed herein is a method of preparing a ready-to-use, non-aqueous oral solution of losartan and its method of use.

BACKGROUND

Angiotensin II receptor blockers (ARBs), such as irbesartan, valsartan, losartan, candesartan, azilsartan, olmesartan, and telmisartan are medications utilized for managing conditions like hypertension, heart failure, chronic kidney disease, and post-heart attack recovery. These drugs function as angiotensin II receptor antagonists, effectively controlling blood pressure and supporting cardiac health. ARBs function by inhibiting the effects of angiotensin II, a hormone known for its vasoconstrictive properties that elevate blood pressure. Angiotensin II also promotes salt and water retention, exacerbating hypertension. These medications work by antagonizing AT1 receptors, which are prevalent in the heart, blood vessels, and kidneys. By blocking angiotensin II from binding to these receptors, ARBs effectively reduce blood pressure and mitigate potential cardiac and renal damage.

One of the most common medications prescribed for high blood pressure (hypertension) is losartan. Losartan potassium, a pharmaceutically acceptable salt of losartan, is a white to off-white free-flowing crystalline powder with a molecular weight of 461.01. It is freely soluble in water, soluble in alcohols, slightly soluble in common organic solvents, such as acetonitrile and methyl ethyl ketone, and practically insoluble in chloroform. The melting point of losartan potassium is between 270° C. to 276° C. Oxidation of the 5-hydroxymethyl group on the imidazole ring results in the active metabolite of losartan.

Losartan potassium, the first of a new class of antihypertensives, is an angiotensin II receptor (Type AT1) antagonist. Angiotensin II, which is formed from angiotensin I in a reaction catalysed by angiotensin-converting enzyme (ACE, kinase II), is a potent vasoconstrictor, the primary vasoactive hormone of the renin-angiotensin system and an important component in the pathophysiology of hypertension. It also stimulates aldosterone secretion by the adrenal cortex.

Losartan potassium is also known as 2-butyl-4-chloro-1-[p-(o-1H-tetrazol-5-ylphenyl)benzyl]imidazole-5-methanol monopotassium salt. Its empirical formula is $C_{22}H_{22}ClKN_6O$ and it has the following structural formula:

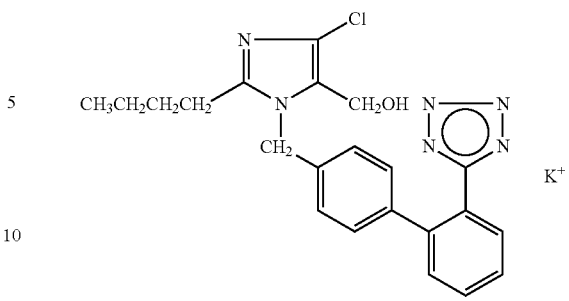

Losartan potassium is indicated for the treatment of hypertension, hypertensive patients with left ventricular hypertrophy, nephropathy in Type 2 diabetic patients. It may be used alone or in combination with other antihypertensive agents. The usual starting dose of losartan potassium is 50 mg once daily, with 25 mg used in patients with possible depletion of intravascular volume (e.g. patients treated with diuretics) and patients with a history of hepatic impairment. If the antihypertensive effect measured at trough using once-a-day dosing is inadequate, a twice-a-day regimen at the same total daily dose or an increase in dose may give a more satisfactory response. If blood pressure is not controlled by losartan potassium alone, a low dose of a diuretic may be added.

COZAAR® is available in US as tablets for oral administration containing either 25 mg, 50 mg, or 100 mg of losartan potassium and the following inactive ingredients: microcrystalline cellulose, lactose hydrous, pregelatinized starch, magnesium stearate, hydroxypropyl cellulose, hypromellose, and titanium dioxide.

COZAAR® is also mentioned about preparation of suspension (For 200 mL of a 2.5 mg/mL suspension). The preparation of suspension is as follows: Add 10 mL of purified water USP to an 8 ounce (240 mL) amber polyethylene terephthalate (PET) bottle containing ten 50 mg COZAAR® tablets. Immediately shake for at least 2 minutes. Let the concentrate stand for 1 hour and then shake for 1 minute to disperse the tablet contents. Separately prepare a 50/50 volumetric mixture of Ora-Plus and Ora-Sweet SF. Add 190 mL of the 50/50 Ora-Plus/Ora-Sweet SF mixture to the tablet and water slurry in the PET bottle and shake for 1 minute to disperse the ingredients. The suspension should be refrigerated at 2-8° C. (36-46° F.) and can be stored for up to 4 weeks. Shake the suspension prior to each use and return promptly to the refrigerator.

COZAAR® 2.5 mg/mL powder and solvent for oral suspension are also available in UK as powder for reconstitution. Each sachet contains 500 mg of losartan potassium powder. A medical or healthcare professional/pharmacist mixes each sachet with 200 mL of solvent to create a suspension. One mL of suspension contains 2.5 mg of losartan potassium. COZAAR® powder is a white to off-white powder. After suspension in solvent, COZAAR® is an off-white liquid.

In the UK, COZAAR® is marketed as a kit that includes a powder for suspension along with a solvent. The COZAAR® powder and solvent for oral suspension is packaged in a kit containing: One foil sachet filled with powder equal to 500 mg losartan potassium; One 473 mL bottle of solvent; One 240 mL bottle with a child resistant closure for mixing the suspension; One 10 mL oral dosing syringe; One push-in bottle adaptor. The other ingredients are as follows: Powder: microcrystalline cellulose, lactose monohydrate, pregelatinised maize starch, magnesium stearate, hydroxypropyl cellulose, hypromellose, and titanium dioxide. Solvent: microcrystalline cellulose, carboxymethylcellulose sodium, citric acid anhydrous, purified water, xanthan gum, methylhydroxybenzoate, sodium phosphate monobasic monohydrate, potassium sorbate, carrageenan calcium sulfate, trisodium phosphate, flavor berry citrus sweet, glycerin, propylhydroxybenzoate, sodium citrate anhydrous, saccharin sodium, sorbitol antifoam AF emulsion (contains water, polydimethylsiloxane, C-14-18, mono- and di-glycerides, polyethylene glycol stearate, and polyethylene glycol). The shelf life is 2 years without reconstitution and after reconstitution: 4 weeks only and need to keep the prepared suspension in a refrigerator (at 2-8° C.) for up to 4 weeks for storage and also need to discard the excess solvent not used in the preparation of the suspension.

Patient acceptability of a drug or medicine is a key aspect in the development of any pharmaceutical formulations of any drug or medicine. Children and older adults differ in many aspects from the other age subsets of the population and require particular considerations in medication acceptability. Especially when it is about solid oral formulations like tablets and capsules, paediatric patient, geriatric patients as well as patients in ICU, poses difficulty swallowing. In such cases, if any drug or medicine is available only in solid oral form, it will be difficult for the healthcare professional to deal with it.

As per one practice in hospitals, they usually prepare extemporaneous liquid formulation by crushing available tablets or emptying the content of capsule formulation in the vehicle and adding sweetener and another one or more ingredients to convert it into a liquid suspension formulation for such patients.

However, that practice is not the solution and also requires a technical skilled person to carry out the whole process, and also in the end there is the possibility of dose error. The powder is prepared into a suspension with water or other reconstitution liquids before administration, and the excess liquid suspension must be disposed of immediately. This can lead to incorrect dose preparations, wasted doses, or incorrect reconstitution errors due to non-medical professionals formulating the wrong concentration of the powder for oral suspension. Further, any excess powder and suspension may contain bacterial contamination or significant degradants if stored for subsequent doses.

In the case of losartan, mainly the solid form that is tablet formulation is available and most of the liquid formulations needs reconstitution.

Carini discloses the active compound (e.g., losartan) as a useful angiotensin II blocker, and its activity in treating hypertension and congestive heart failure. The active ingredient can be administered orally in solid dosage forms, such as capsules, tablets, and powders, or in liquid dosage forms, such as elixirs syrups, and suspensions. It can also be administered parenterally, in sterile liquid dosage forms. Liquid dosage forms for oral administration can contain colouring and flavouring to increase patient acceptance.

Ohtawa discloses a metabolite of losartan. The metabolite may be utilized in compositions such as tablets, capsules, or elixirs for oral administration. A syrup or elixir may contain the metabolite, sucrose as a sweetening agent, methyl and propyl parabens as preservatives, a dye, and a flavoring such as cherry or orange flavor.

Delmarre describes and claims an oral liquid composition of losartan, or a pharmaceutically acceptable salt or metabolite thereof, and at least one pharmaceutically acceptable carrier and a phosphate-containing buffer comprising sodium phosphate, potassium phosphate, or a mixture thereof in an amount sufficient to provide a pH of about 6 or higher. Processes of preparing such compositions and methods of administering such compositions are also included. Delmarre's compositions include unacceptable amounts of water.

Tiernery describes the losartan composition suitable for oral administration, said composition containing a pharmaceutically acceptable salt of losartan and a carrier agent, and one or more pH modifying or buffering agents include any combination of citric acid, sodium citrate, disodium hydrogen phosphate or sodium dihydrogen phosphate, the losartan salt forming a suspension with said carrier agent having the pH of the composition is less than 7. Tiernery's compositions include unacceptable amounts of water.

Kolla describes relates oral liquid pharmaceutical compositions in the form of water-based suspension of losartan or pharmaceutically acceptable salts thereof which has a pH of about 7 using pH modifying agent. Further also provides powder compositions for reconstitution to provide a liquid formulation. Kolla's compositions include unacceptable amounts of water.

In light of the existing prior arts, it can concluded that losartan potassium, a pharmaceutically acceptable salt of losartan, is generally given to patients in a solid dosage form, which can be difficult for some patients to swallow and sometimes in the liquid dosage form like water-based solution or suspension or powder for reconstitution. The powder for reconstitution has some disadvantages since it requires reconstitution or dilution to use, and due to this, there are chances of dosing error. Once reconstituted, the suspension has limited stability and must be used within a few hours or days. In addition, contaminants may be introduced into the suspensions during reconstitution, which may compromise patient safety. The losartan in the liquid solution form is typically completely dissolved in an aqueous solution to form a particle-free solution. However, a problem with known losartan solutions is that the losartan tends to degrade over time to form dimer degradation products.

Hence, liquid dosage forms have more of a challenge because of the solubility and stability characteristics of losartan, as well as the various excipients, in different solvents.

Also, losartan potassium has a bitter taste which is difficult to mask even with strong flavoring or sweetening agents.

The above-mentioned prior compositions comprising liquid dosage formulation have certain drawbacks such as dissolution of the drug, use of water leading to degradation, and reduced stability.

There are many factors associated with the risk of currently approved product, like a) materials required for the reconstitution or dilution may be available at home but it may difficult to remember during travel to obtain all the listed items like if any lack of items may result in postponed or omission of the dose and substitutions may result in exposure to verify the complete dissolution of the powder or may further difficulty in reconstituting or measuring a correct dose, b) incorrect volume of reconstitution liquid, c) incomplete dissolution of powder, d) incorrect dosage, e) may choose different solution while taking the dose, and f) chances of contamination and product degradation is high.

In view of the foregoing, it would be desirable to have suitable oral liquid compositions of losartan with improved dissolution and stability properties as an additional treatment option.

Therefore, there is a serious need in society to provide a non-aqueous oral liquid solution, using minimal ingredients, exhibiting suitable stability for a suitable shelf life. The formulation disclosed herein addresses the problems of the prior compositions by providing a non-aqueous oral solution of losartan that is stable for the long term and can be conveniently administered orally. The inventors developed a ready-to-use, non-aqueous oral solution of losartan, which provide many advantages, such as content uniformity and suitable physicochemical stability.

OBJECTIVES

The main objective disclosed herein relates to a ready-to-use, non-aqueous oral solution of losartan.

The other main objective disclosed herein relates to a ready-to-use, non-aqueous oral solution of losartan which is stable.

Another objective disclosed herein relates to a ready-to-use, non-aqueous oral solution of losartan which is safe and effective.

One other objective disclosed herein relates to a ready-to-use, non-aqueous oral solution of losartan which provides improved patient compliance.

Yet another object disclosed herein relates to a ready-to-use, non-aqueous oral solution of losartan which is ready-to-use.

Yet another object disclosed herein relates to a ready-to-use, non-aqueous oral solution of losartan which is free from water.

SUMMARY

Disclosed herein is a ready-to-use, non-aqueous oral solution of losartan.

The main aspect relates to a ready-to-use, non-aqueous oral solution comprising a therapeutically effective amount of losartan potassium, a solubilizer, a thickening agent, a preservative, and one or more pharmaceutically acceptable excipients.

Yet another aspect disclosed herein relates to a process for preparing a ready-to-use, non-aqueous oral solution of losartan.

DETAILED DESCRIPTION

Before elaborating on embodiments and aspects disclosed herein in detail, it is to be understood that the formulation disclosed herein is not limited to particularly exemplified examples or process parameters that may, of course, vary. It is also to be understood that the terminology used herein is to describe particular embodiments of the disclosed formulation only, and is not intended to limit the scope of the claimed formulation in any manner.

The detailed description set forth below is intended as a description of exemplary embodiments and is not intended to represent the only forms in which the exemplary embodiments may be constructed and/or utilized. The description sets forth the functions and the sequence of steps for constructing and/or operating the exemplary embodiments. However, it is to be understood that the same or equivalent functions and sequences that may be accomplished by different exemplary methods are also intended to be encompassed within the spirit and scope of the formulation claimed herein.

As defined herein, all scientific and technical terms used herein have the same meaning as commonly understood by one of ordinary skill with respect to pharmaceutical sciences.

Although any process and materials similar or equivalent to those described herein can be used in the practice or testing of the formulation disclosed herein, the methods and materials are now described.

The singular forms "a," "an" and "the" specifically also encompass the plural forms of the terms to which they refer, unless the content clearly dictates otherwise.

The term "about" is used synonymously with the term "approximately." As one of ordinary skill would understand, the exact boundary of "about" will depend on the component of the composition. Illustratively, the use of the term "about" indicates that values slightly outside the cited values, i.e., plus or minus 0.1% to 10%, which are also effective and safe. Thus, compositions slightly outside the cited ranges are also encompassed by the scope of the present claims.

As stated herein the word "RTU" refers to ready-to-use and can interchangeably use for the expression "ready-to-use."

As stated herein, the expressions "comprise(s)" and "comprising" have their customary meaning. When used in the context of a process, the term "comprising" means that the process includes at least the recited steps, but may include additional steps. When used in the context of a composition, the term "comprising" means that the composition includes at least the recited features or components, but may also include additional features or components.

One will understand that the expression "consisting of" may replace the expression "comprising" for a claimed formulation, process, or method.

One will further understand that the expression "consisting essentially of" may replace the expression "comprising" for a claimed formulation, process or method.

Where appropriate, effective amounts are generally those amounts listed as the ranges or levels of ingredients in the description.

The expressions "therapeutically effective amount" or "effective amount" refers to an amount of a pharmaceutical agent to achieve a pharmacological effect. The term "therapeutically effective amount" includes, for example, a prophylactically effective amount.

As used herein, the term "therapeutically effective amount" can be understood to include an amount of losartan potassium that is effective in treating, preventing, or ameliorating a condition requiring antihypertensive therapy.

As used herein, the term "active agent" can be understood to include any substance or formulation or combination of substances or composition of matter which, when administered to a human or animal subject, induces a desired pharmacologic and/or physiologic effect by local and/or systemic action. The terms are used interchangeably herein: "active", "drug", and "active ingredient".

As used herein, the terms "dose" and "dosage" can be understood to mean a specific amount of active or therapeutic agents for administration.

As used herein, the term "excipient" can be understood to include any inert substance combined with an active agent such as losartan potassium to prepare a convenient dosage form.

As used herein, the term "glycerin" can be interchangeably used with term "glycerol" as both are same.

As per one embodiment, the "oral solution" as mentioned herein is defined as the liquid dosage form that has no suspended particles and is present as a clear liquid solution.

As per one embodiment, the formulation disclosed herein is ready-to-use, i.e. ready to be administered directly to a patient for a treatment, without an additional step, such as reconstitution or dilution.

The main embodiment disclosed herein relates to a ready-to-use, non-aqueous oral solution of losartan potassium.

Another main embodiment disclosed herein relates to a ready-to-use, non-aqueous oral solution comprising a therapeutically effective amount of losartan potassium, a solubilizer, a thickening agent, a preservative, and one or more pharmaceutically acceptable excipients.

An embodiment disclosed herein relates to a ready-to-use, non-aqueous oral solution comprising a therapeutically effective amount of losartan potassium for the treatment of a cardiac condition like hypertension, hypertensive patients with left ventricular hypertrophy, nephropathy in Type 2 diabetic patients, wherein losartan potassium may be used alone or in combination with other antihypertensive agents.

An embodiment disclosed herein may be associated with the expression "free of water" where the amount of water in the formulation is less than about 1% w/w, about 0.5% w/w, about 0.4% w/w, about 0.3% w/w, about 0.25% w/w, about 0.2% w/w, about 0.1% w/w, about 0% w/w, or 0% w/w (i.e., the formulation is completely devoid of water). One will appreciate that the water content expressed in percent by weight (i.e., % w/w) is based on the total weight of the formulation. Thus, for example, 1% w/w corresponds to 1 g of $H_2O$ in 100 g of the formulation. In the presence of water, losartan potassium tends to degrade and results in an unstable product on storage. The expressions "free of water" and "non-aqueous" are used interchangeably herein.

In one aspect, the ready-to-use, non-aqueous oral solution disclosed herein does not include water, a buffer (for example, phosphate buffer, citrate buffer, etc.), or a pH adjusting agent (for example, NaOH, HCl, etc.), a solubilizer (for example, propylene glycol (PG)), a preservative (for example, an alkyl ester of p-hydroxybenzoic acid which includes methyl paraben, propyl paraben, ethyl paraben, etc.), a polymer (for example, polyvinylpyrrolidone (or povidone), hydroxypropyl methylcellulose (or hypromellose), cyclodextrin, hydroxy ethyl cellulose), a chelating agent (for example, ethylenediaminetetraacetic acid (EDTA or a salt thereof), and a sweetener (for example, saccharin sodium). One will appreciate that povidone (aka, polyvinylpyrrolidone (or PVP)) is available commercially (e.g., Kollidon®) with different grades that relate generally to the weight average molecular weight (Mw). For example, Kollidon® 25 (aka PVPK25) has a Mw of from 28,000 Daltons (Da) to 34,000 Da, Kollidon® 30 (aka PVPK30) has a Mw of from 44,000 Da to 54,000 Da, while Kollidon® 90 (aka PVPK90) has a Mw of from 900,000 Da to 1,200,000 Da. See Handbook at 581.

The term "losartan" as used herein is in the form of potassium salt. Wherever losartan is mentioned is to be interpreted as losartan potassium.

As per one embodiment, losartan relates to losartan potassium.

In one aspect, the ready-to-use, non-aqueous oral solution comprises losartan potassium.

As per one embodiment, the amount of losartan potassium may range from about 0.01 mg/mL to about 50 mg/mL, and all values in between, such as about 0.01 mg/mL to about 40 mg/mL, about 0.1 mg/mL to about 30 mg/mL, about 1 mg/mL to about 20 mg/mL and all values in between, such as for example about 1 mg/mL, about 5 mg/mL, about 10 mg/mL, about 15 mg/mL, about 20 mg/mL, about 25 mg/mL, about 30 mg/mL, about 35 mg/mL, about 40 mg/mL, about 45 mg/mL, and about 50 mg/mL.

As per one embodiment, the "solubilizer" used herein is defined as an agent that increases the solubility of a losartan potassium. Solubilizers can increase the bioavailability of active pharmaceutical ingredients.

As per one embodiment, the solubilizer can be selected from, but not limited to, alcohols such as ethanol, a polyethylene glycol (PEG), glycerin, triacetin, dimethylsulfoxide (DMSO), benzyl benzoate, or any combination thereof.

As per one embodiment, a polyethylene glycol (PEG) can be selected from PEG 200, PEG 400, PEG 600, PEG 1500, PEG 4000, and PEG 6000.

In one aspect, the solubilizer comprises PEG 400.

According to one embodiment, the amount of solubilizer may be present in range from about 50 mg/mL to about 500 mg/mL, and all values in between, such as from about 50 mg/mL to about 300 mg/mL, from about 50 mg/mL to about 250 mg/mL, from about 50 mg/mL to about 200 mg/mL, and from about 70 mg/mL to about 150 mg/mL, as well as about 50 mg/mL, about 60 mg/mL, about 70 mg/mL, about 80 mg/mL, about 90 mg/mL, about 100 mg/mL, about 110 mg/mL, about 115 mg/mL, about 120 mg/mL, about 140 mg/mL, about 160 mg/mL, about 180 mg/mL, about 200 mg/mL, about 250 mg/mL, about 300 mg/mL, about 400 mg/mL, and about 500 mg/mL.

In one aspect, a variable amount of PEG 400-to-glycerin may be used, such that the weight ratio of PEG 400-to-glycerin in the oral solution disclosed herein ranges from about 5:95 to about 50:50 and all values in between, such as 10:90, 15:85, 20:80, 25:75, 30:70, 35:65, 40:60, and 45:55. In yet another aspect, the weight ratio of PEG 400-to-glycerin in the oral solution disclosed herein ranges from about 5:95 to 15:85.

As per one embodiment, the "thickening agent" relates to an agent that can increase the viscosity of a liquid without substantially changing its other properties.

As per one embodiment, said thickening agent can be selected from methylcellulose, bentonite, hectorite, microcrystalline cellulose, sodium carboxymethylcellulose, magnesium aluminum silicate, xanthan gum, acacia, tragacanth, an alginate, guar gum, colloidal silicon dioxide, or any combination thereof.

In one aspect, the thickening agent comprises xanthan gum.

According to one embodiment, the amount of thickening agent may be present in the range from about 0.01 mg/mL to about 15 mg/mL, and all values in between, such as from about 0.01 mg/mL to about 12 mg/mL, from about 0.01 mg/mL to about 10 mg/mL, from about 0.05 mg/mL to about 10 mg/mL, from about 0.1 mg/mL to about 10 mg/mL, from about 0.5 mg/mL to about 10 mg/mL, as well as about 0.1 mg/mL, about 0.3 mg/mL, about 0.5 mg/mL, about 0.7 mg/mL, about 0.9 mg/mL, about 1 mg/mL, about 1.1 mg/mL, about 1.2 mg/mL, about 1.3 mg/mL, about 1.4 mg/mL, about 1.5 mg/mL, about 1.7 mg/mL, about 2 mg/mL, about 4 mg/mL, about 6 mg/mL, about 8 mg/mL, about 10 mg/mL, and about 15 mg/mL.

In one aspect, the thickening agent comprises xanthan gum in an amount of about 1.5 mg/mL.

As per one embodiment, the "preservative" relates to a substance that prevents decomposition by microbial growth or by undesirable chemical changes. Herein the expressions "preservative" and "antimicrobial agent" are used interchangeably.

As per one embodiment, preservative can be selected from, but not limited to, sorbic acid, sodium sorbate, potassium sorbate, benzoic acid, and benzoates such as sodium benzoate, nitrates, lactic acid, or any combination thereof.

As per an embodiment, the preservative comprises sodium benzoate.

According to one embodiment the amount of preservative may be present in the range from about 0.01 mg/mL to about 20 mg/mL, and all values in between, such as from about 0.01 mg/mL to about 15 mg/mL, from about 0.01 mg/mL to about 12 mg/mL, from about 0.01 mg/mL to about 10 mg/mL, and from about 0.01 mg/mL to about 5 mg/mL, as well as about 0.01 mg/mL, about 0.05 mg/mL, about 0.1 mg/mL, about 0.2 mg/mL, about 0.3 mg/mL, about 0.4 mg/mL, about 0.5 mg/mL, about 0.7 mg/mL, about 0.9 mg/mL, about 1 mg/mL, about 2 mg/mL, about 5 mg/mL, about 7 mg/mL, about 9 mg/mL, about 11 mg/mL, about 13 mg/mL, about 15 mg/mL, and about 20 mg/mL.

As per one embodiment, the "sweetener" relates to an additive used or intended to be used to impart a sweet taste to a formulation disclosed herein.

As per one embodiment, the sweetener can be selected from sucrose, fructose, lactose, maltose, sucralose, maltitol, aspartame, acesulfame potassium (Ace-K), neotame, advantame, or any combination thereof.

As per a preferred embodiment, the sweetener comprises sucralose.

According to one embodiment, the amount of sweetener may be present in the range from about 0.01 mg/mL to about 15 mg/mL, and all values in between, such as from about 0.01 mg/mL to about 10 mg/mL, from about 0.1 mg/mL to about 10 mg/mL, from about 0.1 mg/mL to about 5 mg/mL, from about 0.5 mg/mL to about 3 mg/mL, as well as about 0.01 mg/mL, about 0.05 mg/mL, about 0.1 mg/mL, about 0.2 mg/mL, about 0.3 mg/mL, about 0.4 mg/mL, about 0.5 mg/mL, about 0.7 mg/mL, about 0.9 mg/mL, about 1 mg/mL, about 2 mg/mL, about 5 mg/mL, about 7 mg/mL, about 9 mg/mL, about 11 mg/mL, about 13 mg/mL, and about 15 mg/mL.

As per one embodiment, the "flavoring agent" relates to a pharmaceutical additive added to improve the taste or odour of a formulation disclosed herein.

As per one embodiment the flavoring agent can be selected from but not limited to vanilla, citrus oil, including lemon, orange, grape, lime and grapefruit, and fruit essences, including apple, banana, orange pear, peach, strawberry, raspberry, cherry, plums pineapple, apricot, frozen peppermint, tutti frutti flavor and so forth and the like, or any combination thereof.

As per an embodiment, the flavoring agent comprises frozen peppermint.

According to one embodiment, the amount of flavoring agent may be present in the range from about 0.01 mg/mL to about 15 mg/mL, and all values in between, such as from about 0.01 mg/mL to about 10 mg/mL, from about 0.01 mg/mL to about 5 mg/mL, from about 0.05 mg/mL to about 5 mg/mL, and from about 0.05 mg/mL to about 2 mg/mL, as well as about 0.01 mg/mL, about 0.05 mg/mL, about 0.1 mg/mL, about 0.2 mg/mL, about 0.3 mg/mL, about 0.4 mg/mL, about 0.5 mg/mL, about 0.7 mg/mL, about 0.9 mg/mL, about 1 mg/mL, about 2 mg/mL, about 5 mg/mL, about 7 mg/mL, about 9 mg/mL, about 11 mg/mL, about 13 mg/mL, and about 15 mg/mL.

As per one embodiment, the vehicle comprises glycerin.

According to one embodiment, the amount of vehicle may be present in sufficient quantity to make up the final volume.

As per one embodiment, one or more pharmaceutically acceptable excipients are selected from preservative, a viscosity enhancer or a viscosity enhancing agent, a solubilizer or a solubilizing agent, a sweetener or a sweetening agent, a wetting agent, a co-solvent, a flavor or a flavour, a vehicle, a suspending agent or a thickening agent, a taste masking agent, an antioxidant, a stabilizer, a colorant and any other excipient known to the art for making formulations, or any combination thereof.

Another embodiment disclosed herein related to a process for preparing a ready-to-use, non-aqueous oral solution of losartan potassium, which comprises:
(a) Adding the vehicle to a vessel;
(b) Adding solubilizer into the glycerin-containing mixing vessel of step (a) with continuous stirring;
(c) Adding preservative into the solution obtained in step (b) with continuous stirring;
(d) Adding sweetener into the solution obtained in step (c) with continuous stirring;
(e) Adding losartan potassium (API) into the solution obtained in step (d) with continuous stirring;
(f) Adding xanthan gum in glycerin in a separate vessel to prepare a slurry;
(g) Adding slurry obtained in step (f) in the solution obtained in step (e);
(h) Adding flavoring agent into solution obtained in step (g) under continuous stirring;
(i) Adjusting the volume of bulk solution into the mixing vessel using a vehicle with continuous stirring;
(j) Filtering bulk solution obtained in step (i) to get a clear solution;
(k) Storing the final formulation obtained in step (j) in the suitable container.

An embodiment disclosed herein relates to a ready-to-use, non-aqueous oral solution comprising about 0.01 mg/mL to about 50 mg/mL losartan potassium, about 50 mg/mL to about 500 mg/mL solubilizer, about 0.01 mg/mL to about 15 mg/mL thickening agent, about 0.01 mg/mL to about 20 mg/mL preservative, about 0.01 mg/mL to about 15 mg/mL sweetener, about 0.01 mg/mL to about 15 mg/mL flavoring agent, and glycerin.

Another embodiment disclosed herein relates to a ready-to-use, non-aqueous oral solution comprising about 1 mg/mL to about 15 mg/mL losartan potassium, about 70 mg/mL to about 150 mg/mL solubilizer, about 0.5 mg/mL to about 10 mg/mL thickening agent, about 0.01 mg/mL to about 5 mg/mL preservative, about 0.5 mg/mL to about 3 mg/mL sweetener, about 0.5 mg/mL to about 3 mg/mL flavoring agent, and glycerin.

And yet another embodiment disclosed herein relates to a ready-to-use, non-aqueous oral solution comprising about 10 mg/mL losartan potassium, about 115 mg/mL solubilizer, about 1.5 mg/mL thickening agent, about 0.40 mg/mL preservative, about 1 mg/mL sweetener, about 1 mg/mL flavoring agent, and glycerin.

And a further embodiment disclosed herein relates to a ready-to-use, non-aqueous oral solution comprising about 10 mg/mL losartan potassium, about 115 mg/ml solubilizer, about 1.5 mg/mL thickening agent, about 0.40 mg/mL preservative, about 1 mg/mL sweetener, about 1 mg/mL flavoring agent, and glycerin; wherein the non-aqueous oral solution is free of (or excludes) a buffering agent (e.g., sodium phosphate buffer, potassium phosphate buffer, a sodium citrate buffer, and the like), a pH adjusting agent (e.g., NaOH and/or HCl), propylene glycol, an alkyl ester of p-hydroxybenzoic acid, povidone (e.g., PVP K30 and PVP K90), hydroxypropyl methylcellulose, hydroxyethyl cellulose, and saccharin sodium.

Another embodiment disclosed herein relates to a ready-to-use, non-aqueous oral solution comprising about 10 mg/mL losartan potassium, about 115 mg/mL polyethylene glycol 400, about 1.5 mg/mL xanthan gum, about 0.40 mg/mL sodium benzoate, about 1 mg/mL sucralose, about 1 mg/mL frozen peppermint, and glycerin.

Yet another embodiment disclosed herein relates to a ready-to-use, non-aqueous oral solution comprising about 10 mg/mL losartan potassium, about 115 mg/mL polyethylene glycol 400, about 1.5 mg/mL xanthan gum, about 0.40 mg/mL sodium benzoate, about 1 mg/mL sucralose, about 1 mg/mL frozen peppermint, and glycerin; wherein the non-aqueous oral solution is free of (or excludes) a buffering agent (e.g., sodium phosphate buffer, potassium phosphate buffer, a sodium citrate buffer, and the like), a pH adjusting agent (e.g., NaOH and/or HCl), propylene glycol, an alkyl ester of p-hydroxybenzoic acid, povidone (e.g., PVP K30 and PVP K90), hydroxypropyl methylcellulose, hydroxy ethyl cellulose, and saccharin sodium.

In one aspect, the ready-to-use, non-aqueous oral solution disclosed herein is independent of the pH effect and hence no need to add any buffering agent or pH adjusting agent to maintain the pH and still provide a stable formulation.

According to one embodiment, the formulation disclosed herein may be administered orally.

According to one embodiment, a ready-to-use, non-aqueous oral solution of losartan potassium is stable for at least 1 month, 3 months, and 6 months while storage at 40° C.±2° C./not more than (NMT) 25% RH or while stored at 25° C.±2° C./60% RH±5% RH.

According to one embodiment, a ready-to-use, non-aqueous oral solution of losartan potassium is stable at –20° C.±5° C. under stress conditions of UV light.

According to one embodiment, the total impurities are less than 1.0% and any single impurities is less than 0.2% after 1 month, 3 months, and 6 months while storage at 40° C.±2° C./NMT 25% RH or while stored at 25° C.±2° C./60% RH±5% RH.

According to one embodiment, the ready-to-use, non-aqueous oral solution of losartan, when administered as a single dose of about 100 mg to a subject under fasted condition provides a mean (±SD) of the following pharmacokinetic parameters: $T_{max}$ (h): 0.500 (0.333-2.667); $C_{max}$ (ng/mL): 806.187±362.8349; $AUC_{0-t}$ (ng·h/mL): 1530.980±948.0597; $AUC_{0-\infty}$ (ng·h/mL): 1560.022±1013.3460; and $T_{1/2}$ (h): 2.777±1.7685.

According to one embodiment, the ready-to-use, non-aqueous oral solution of losartan, when administered as a single dose of about 100 mg to a subject under fasted condition provides a geometric least square ranges of maximum plasma concentration ($C_{max}$) from about 300 ng/mL to about 1200 ng/ml; area under the plasma concentration versus time curve from time 0 to the last measurable concentration time ($AUC_{0-t}$) from about 800 ng·h/mL to about 1800 ng·h/mL; and area under the plasma concentration versus time curve from time 0 to infinity ($AUC_{0-\infty}$) from about 800 ng·h/mL to about 1800 ng·h/mL.

According to one embodiment, the ready-to-use, non-aqueous oral solution of losartan, when administered as a single dose of about 100 mg to a subject under fasted condition which provides a geometric least square means of pharmacokinetic profiles like maximum plasma concentration ($C_{max}$) 729.456 ng/ml; area under the plasma concentration versus time curve from time 0 to the last measurable concentration time ($AUC_{0-t}$) 1352.590 ng·h/mL; and area under the plasma concentration versus time curve from time 0 to infinity ($AUC_{0-\infty}$) 1369.275 ng·h/mL.

According to one embodiment, the ready-to-use, non-aqueous oral solution of losartan, when administered as a single dose of about 100 mg to a subject has a T/R ratio of from about 50% to about 125%, wherein T is a $C_{max}$-value of the dose after administration to a human, and wherein R is a $C_{max}$-value of a tablet comprising 100 mg losartan potassium (COZAAR®) after administration to the human.

According to one embodiment, the ready-to-use, non-aqueous oral solution of losartan, when administered as a single dose of about 100 mg to a subject has a T/R ratio of from about 80% to about 125%, wherein T is a $C_{max}$-value of the dose after administration to a human, and wherein R is a $C_{max}$-value of a tablet comprising 100 mg losartan potassium (COZAAR®) after administration to the human.

According to one embodiment, the ready-to-use, non-aqueous oral solution of losartan, when administered as a single dose of about 100 mg to a subject under fed condition which provides a mean (±SD) of pharmacokinetic profiles as mentioned below: $T_{max}$ (h): 1.517 (0.333-5.333); $C_{max}$ (ng/ml): 391.357±119.2530; $AUC_{0-t}$ (ng·h/mL): 1261.942±332.9989; $AUC_{0-\infty}$ (ng·h/mL): 1273.174±336.8092; and $T_{1/2}$ (h): 1.971±0.8227.

According to one embodiment, the ready-to-use, non-aqueous oral solution of losartan, when administered as a single dose of about 100 mg to a subject under fed condition which provides a geometric least square ranges of pharmacokinetic profiles like maximum plasma concentration ($C_{max}$) from about 100 ng/ml to about 700 ng/ml; area under the plasma concentration versus time curve from time 0 to the last measurable concentration time ($AUC_{0-t}$) from about 800 ng·h/mL to about 1600 ng·h/mL; and area under the plasma concentration versus time curve from time 0 to infinity ($AUC_{0-\infty}$) from about 800 ng·h/mL to about 1600 ng·h/mL.

According to one embodiment, the ready-to-use, non-aqueous oral solution of losartan, when administered as a single dose of about 100 mg to a subject under fed condition which provides a geometric least square means of pharmacokinetic profiles like maximum plasma concentration ($C_{max}$) 374.396 ng/mL; area under the plasma concentration versus time curve from time 0 to the last measurable concentration time ($AUC_{0-t}$) 1210.894 ng·h/mL; and area under the plasma concentration versus time curve from time 0 to infinity ($AUC_{0-\infty}$) 1221.448 ng·h/mL.

The following examples, which include exemplified embodiments, serve to illustrate the ready-to-use, non-aqueous solution disclosed herein, it being understood that the particulars shown are by way of example and for illustrative discussion and not meant to limit the ready-to-use, non-aqueous solution claimed herein.

EXAMPLES

Example 1. Solubility Study of Losartan Potassium

The solubility of losartan potassium below pH 5.5 was checked in the presence of different solubilizers and pH modifying agent. Table 1 summarizes results of this study.

TABLE 1

Solubility study of losartan potassium in presence of different solubilizers and pH modifying agent

| Batch Number | Composition | Observations |
|---|---|---|
| S1 | Losartan Potassium 10 mg/mL, Citrate buffer 50 mM 60% v/v, PEG 400 40% v/v | Insoluble (Milky white insoluble particles) |

TABLE 1-continued

Solubility study of losartan potassium in presence of different solubilizers and pH modifying agent

| Batch Number | Composition | Observations |
|---|---|---|
| S2 | Losartan Potassium 10 mg/mL, Citrate buffer 50 mM 60% v/v, Propylene glycol 40% v/v | Insoluble (Milky white insoluble particles) |
| S3 | Losartan Potassium 10 mg/mL, Citrate buffer 50 mM 60% v/v, Glycerin 40% v/v | Insoluble (Milky white insoluble particles) |
| S4 | Losartan Potassium 10 mg/mL, Citrate buffer 50 mM 90% v/v, Labrasol 10% v/v | Insoluble (Milky white insoluble particles) |
| S5 | Losartan Potassium 10 mg/mL, Citrate buffer 50 mM 95% v/v, Tween 5% v/v | Insoluble (Milky white insoluble particles) |

The findings indicated that losartan potassium showed insolubility across all tested solubilizers.

Example 2. Solubility Study of Losartan Potassium with Different Concentration of Solubilizers The losartan exhibited insolubility in tested solubilizers, hence, further study was conducted to investigate the impact of different solubilizers concentration and pHW modifying agent on the solubility of losartan potassium. Table 2 summarizes the results of this study.

TABLE 2

Solubility study of Losartan Potassium in presence of different solubilizers concentration and pH modifying agent

| Batch Number | Composition | Observations |
|---|---|---|
| S6 | Losartan Potassium 10 mg/mL, PEG 400 20% v/v, Glycerin 30% v/v, 100 mM citrate buffer 50% v/v | Insoluble (Milky white insoluble particles) |
| S7 | Losartan Potassium 10 mg/mL, PEG 400 16% v/v, Glycerin 25% v/v, Liquid sorbitol 16%, 100 mM citrate buffer 42% v/v | Insoluble (Milky white insoluble particles) |
| S8 | Losartan Potassium 10 mg/mL, PEG 400 25% v/v, Glycerin 15% v/v, Liquid sorbitol 60%, 10% citric acid to adjust pH 4 | Insoluble (Milky white insoluble particles) |
| S9 | Losartan Potassium 10 mg/mL, PEG 400 25% v/v, Glycerin 15% v/v, Liquid sorbitol 60%, 2.5% citric acid to adjust pH 4.85 | Clear Solution |

It was inferred that a clear solution was achieved by combining PEG 400 and glycerin when adjusting the pH below 5 with a 2.5% citric acid solution.

Citric acid was included in the formulation to assess its impact on enhancing the solubility of the active pharmaceutical ingredient (API) in the non-aqueous base. However, an increase in the content of an unspecified impurity was observed, which was attributed to the presence of water in the citric acid buffer. Given the presence of the increased impurity content in the presence of water, a decision was made to minimize (and/or eliminate) water content. Based on these and other results showing degradation in the presence of water, a decision was made to utilize a non-aqueous formulation. Accordingly, the finalized formulation was independent of pH, and therefore, no pH-modifying agents were added in further trials related to non-aqueous formulations.

Example 3. Comparative Dissolution Trials of Formulation with Varied Excipients

The study was conducted to check effect of varied excipients on dissolution profile of the formulation as compared to reference product.

TABLE 3

Dissolution trial with different concentration and grade of PVP with varied concentration of Xanthan gum

| | Batch No. | | | |
|---|---|---|---|---|
| | B1 | B2 | B3 | B4 |
| Ingredients | Quantity (mg/mL) | | | |
| Losartan Potassium | 10.00 | 10.00 | 10.00 | 10.00 |
| PEG-400 | 113.00 | 113.00 | 113.00 | 113.00 |
| Sodium benzoate | 1.00 | 1.00 | 1.00 | 1.00 |
| Sucralose | 1.00 | 1.00 | 1.00 | 1.00 |
| Xanthan gum | — | 0.25 | 0.50 | 0.50 |
| PVP K90 | — | 5.0 | 10.0 | — |
| PVP K30 | — | — | — | 10.0 |
| Frozen peppermint | 1.00 | 1.00 | 1.00 | 1.00 |
| Glycerin | Q.S to 1 mL | Q.S to 1 mL | Q.S to 1 mL | Q.S to 1 mL |

TABLE 4

Results of dissolution trial with different concentration and grade of PVP with varied concentration of Xanthan gum

| Media | Deaerated water | | | | |
|---|---|---|---|---|---|
| Volume | 900 mL | | | | |
| Apparatus | USP type—II Paddle | | | | |
| RPM | 50 RPM | | | | |
| Dissolution | Average % Drug Release | | | | |
| Time (Min) | 10 | 20 | 30 | 45 | 60 |
| RLD COZAAR ® 100 mg | 35 | 51 | 79 | 95 | 97 |
| B1 | 99 | 99 | 99 | 99 | 98 |
| B2 | 65 | 96 | 97 | 97 | 96 |
| B3 | 65 | 95 | 99 | 99 | 99 |
| B4 | 75 | 98 | 98 | 99 | 99 |

In the comparison of dissolution profiles among different batches, batch B4 containing PVP K30 (10 mg/mL) and xanthan gum (0.5 mg/mL) demonstrated higher cumulative % drug release than batch B3, which contained PVP K90 (10 mg/mL) and xanthan gum (0.5 mg/mL). Similarly, batch B2, formulated with PVP K90 (5 mg/mL) and xanthan gum (0.25 mg/mL), exhibited a dissolution profile similar to that of batch B3.

Notably, batch B1, which did not contain xanthan gum or PVP K90/PVP K30, displayed faster dissolution compared to all other batches with varying grades and concentrations of PVP and xanthan gum. Hence these batches were further evaluated.

Example 4. Biostudy of Batch B1 Evaluating Bioavailability and Pharmacokinetic/Pharmacodynamic Parameters with Respect to Reference Product (COZAAR®)

The results of bio study of batch B1 with reference product are as follows:

TABLE 5

Results of bio study of Batch B1

| Parameters | Geometric Least Squares Mean (T) | (R) | T/R (%) | % ISCV | 90% CI |
|---|---|---|---|---|---|
| $C_{max}$ (ng/ml) | 1007.629 | 918.893 | 109.66 | 38.30 | 83.07-144.75 |
| AUC (ng*hr/mL) | 1288.548 | 1332.386 | 96.71 | 8.87 | 90.5-103.35 |

Based on the results, it was observed that the 90% confidence interval for $C_{max}$ was skewed towards the upper limit (144.75%). Therefore, this formulation was excluded from further consideration.

Example 5. Biostudy of Batches B5 and B2 with Reference Product (COZAAR®)

The biostudy was conducted for formulations containing xanthan gum with and without PVP K90 with reference product.

TABLE 6

Formulation details for Bio study

| Ingredients | Batch No. B5 mg/mL | B2 mg/mL |
|---|---|---|
| Losartan potassium | 10.00 | 10.00 |
| Polyethylene glycol 400 | 113.0 | 113.0 |
| Sodium benzoate | 1.00 | 1.00 |
| Sucralose | 1.00 | 1.00 |
| Xanthan Gum | 2.0 | 0.25 |
| PVP K90 | — | 5.00 |
| Frozen peppermint | 1.00 | 1.00 |
| Glycerin | Q.S. to 1 mL | Q.S. to 1 mL |

TABLE 7

Geometric least squares mean and 90% CI of batch B5 vs reference product

| Parameters | Geometric Least Squares Mean (T) | (R) | T/R (%) | % ISCV | 90% CI |
|---|---|---|---|---|---|
| $C_{max}$ (ng/mL) | 635.993 | 695.073 | 91.50 | 31.154 | 79.36-105.49% |
| AUC (ng*hr/mL) | 883.158 | 974.198 | 90.65 | 22.988 | 82.97-99.05% |

TABLE 8

Geometric least squares mean and 90% CI of batch B2 vs reference product

| Parameters | Geometric Least Squares Mean (T) | (R) | T/R (%) | % ISCV | 90% CI |
|---|---|---|---|---|---|
| $C_{max}$ (ng/mL) | 754.497 | 695.015 | 108.56 | 31.154 | 95.15-123.86% |
| AUC (ng*hr/mL) | 867.822 | 972.584 | 89.23 | 22.988 | 82.20-96.85% |

Based on the results, it was observed that the 90% confidence interval for $C_{max}$ was slightly lower for batch B5 and slightly higher for batch B2. The use of PVP K90 resulted in prolonged dissolution times and increased formulation viscosity, leading to its exclusion from selection.

Consequently, batch B5 was chosen for further development with a reduced concentration of xanthan gum. Additionally, minor adjustments were made to the concentrations of xanthan gum and PEG 400 to achieve the desired outcomes.

Further, preservative efficacy testing (PET) was conducted for higher to lower concentration of sodium benzoate, and based on the results of the PET studies, concentration of sodium benzoate was optimised.

Example 6. Comparative Dissolution Trials with Different Concentration of Xanthan Gum The study aimed to evaluate how concentration of xanthan gum affect the release of the losartan potassium (API) in comparison to the reference product (COZAAR®).

TABLE 9

Composition details for dissolution trial with different concentration of thickening agent

| Ingredients | Batch No. B6 Quantity (mg/mL) | B5 Quantity (mg/mL) |
|---|---|---|
| Losartan Potassium | 10.00 | 10.00 |
| PEG-400 | 113.00 | 113.00 |
| Sodium benzoate | 1.00 | 1.00 |
| Sucralose | 1.00 | 1.00 |
| Xanthan gum | 1.00 | 2.00 |
| Frozen peppermint | 1.00 | 1.00 |
| Glycerin | Q.S to 1 mL | Q.S to 1 mL |

TABLE 10

Results of comparative dissolution trials with different concentration of thickening agent

| Media | Deaerated water |
|---|---|
| Volume | 900 mL |
| Apparatus | USP type—II Paddle |
| RPM | 50 RPM |
| Dissolution | Average % Drug Release |

| Time (Min) | 10 | 15 | 30 | 45 | 60 |
|---|---|---|---|---|---|
| RLD COZAAR ® 100 mg | 35 | 51 | 79 | 95 | 97 |
| B6—Xanthan gum—1.0 mg/ml | 74 | 92 | 97 | 97 | 97 |
| B5—Xanthan gum—2.0 mg/ml | 61 | 81 | 97 | 96 | 96 |

Based on the results, it was noted that there is a trend of decreasing cumulative % drug release with higher concentrations of xanthan gum. This indicates that xanthan gum can effectively be utilized to regulate the release of losartan potassium, potentially achieving extended-release characteristics.

Example 7. Formulation of a Non-Aqueous Oral Solution of Losartan Potassium (B7)

TABLE 11

Formulation of a ready-to-use non-aqueous oral solution of losartan potassium (B7)

| No. | Ingredients | Quantity (mg/mL) |
|---|---|---|
| 1 | Losartan potassium | 0.01-50 |
| 2 | Sodium benzoate | 0.01-20 |
| 3 | Xanthan gum | 0.01-15 |
| 4 | Sucralose | 0.01-15 |
| 5 | Frozen peppermint | 0.01-15 |
| 6 | Polyethylene glycol 400 | 50-500 |
| 7 | Glycerin | Q.S. |

Example 8. Formulation of a Non-Aqueous Oral Solution of Losartan Potassium (B8)

TABLE 12

Formulation of a ready-to-use non-aqueous oral solution of losartan potassiu

| No. | Ingredients | Quantity (mg/mL) |
|---|---|---|
| 1 | Losartan potassium | 1-15 |
| 2 | Sodium benzoate | 0.01-5 |
| 3 | Xanthan Gum | 0.5-10 |
| 4 | Sucralose | 0.5-3 |
| 5 | Frozen peppermint | 0.5-3 |
| 6 | Polyethylene glycol 400 | 70-150 |
| 7 | Glycerin | Q.S. |

Example 9. Formulation of a Non-Aqueous Oral Solution of Losartan Potassium (B9)

TABLE 13

Formulation of a ready-to-use non-aqueous oral solution of losartan potassium (I

| No. | Ingredients | Quantity (mg/mL) | Quantity (% w/v) |
|---|---|---|---|
| 1 | Losartan potassium | 10.00 | 1 |
| 2 | Sodium benzoate | 0.40 | 0.04 |
| 3 | Xanthan Gum | 1.50 | 0.15 |
| 4 | Sucralose | 1.00 | 0.1 |
| 5 | Frozen peppermint | 1.00 | 0.1 |
| 6 | Polyethylene glycol 400 | 115.0 | 11.5 |
| 7 | Glycerin | Q.S. to 1 mL | Q.S. to 100% |

Procedure:
  (a) Glycerin was added in a vessel having a temperature;
  (b) Polyethylene glycol 400 was added into the glycerin-containing mixing vessel of step (a) with continuous stirring;
  (c) Sodium benzoate was added into the solution obtained in step (b) with continuous stirring;
  (d) Sucralose was added into the solution obtained in step (c) with continuous stirring;
  (e) Losartan potassium (API) was added into the solution obtained in step (d) with continuous stirring;
  (f) Xanthan gum was added in glycerin in a separate vessel to prepare a slurry;
  (g) The slurry obtained in step (f) was added to the solution obtained in step (e);
  (h) Frozen peppermint was added into the solution obtained in step (g) under continuous stirring;
  (i) The volume of bulk solution was adjusted into the mixing vessel using glycerin with continuous stirring;
  (j) The bulk solution obtained in step (i) was filtered to get a clear solution;
  (k) The final formulation (having a density of 1.24±0.03 g/mL) obtained in step (j) was stored in the suitable container.

Example 10. Thermal Stability Study

The stability study was conducted for 3 and 6 months at 40° C./NMT 25% RH & 25° C./60% RH.

TABLE 14

Results of Thermal Stability Study of Formulation B9

| | Batch No. | | Formulation B9 | | | | | |
| | Pack Details | | 185 CC HDPE bottle packed in secondary white box | | | | | |
| | Storage | | 40° C. + 2° C./NMT 25% RH | | | 25° C. + 2° C./60 + 5% RH | | |
| Test parameters | condition Specification | Initial | 1M Invert | 3M Invert | 6M Invert | 1M Invert | 3M Invert | 6M Invert |
|---|---|---|---|---|---|---|---|---|
| Description | A clear colorless to light yellow color solution. | Clear Colorless Solution | Clear Colorless Solution | Clear Colorless Solution | Clear Colorless Solution | Clear Colorless Solution | Clear Colorless Solution | Clear Colorless Solution |
| Assay of Losartan Potassium | 95.0% to 105.0% of labelled amount | 102.80% | 99.60% | 100.60% | 99.90% | 100.60% | 100.60% | 100.60% |

TABLE 14-continued

Results of Thermal Stability Study of Formulation B9

| | Batch No. Pack Details Storage | Formulation B9 185 CC HDPE bottle packed in secondary white box | | | | | |
|---|---|---|---|---|---|---|---|
| | | 40° C. + 2° C./NMT 25% RH | | | 25° C. + 2° C./60 + 5% RH | | |
| Test parameters | condition Specification | Initial | 1M Invert | 3M Invert | 6M Invert | 1M Invert | 3M Invert | 6M Invert |
| Assay of Sodium benzoate | 90.0% to 110.0% of labelled amount | 103.40% | 101.10% | 102.30% | 101.50% | 101.00% | 101.00% | 101.00% |
| | | | Related Substances | | | | | |
| Single maximum unknown impurity | Any unspecified Impurity: NMT 0.2% | BQL | BQL | 0.06 | 0.11 | BQL | BQL | 0.05 |
| Total impurities | Total impurities: NMT 1.0% | 0.0 | 0.0 | 0.06 | 0.11 | 0.0 | 0.0 | 0.5 |

The results indicates that the final formulation was found to be stable at 40° C.±2° C./NMT 25% & 25° C.±2° C./60±5% RH at least for 6 months.

Example 11. Photostability Studies

A photostability study was performed on the formulation B9.

TABLE 15

Results of Photostability Study of Formulation B9

| | Batch No | Formulation B9 | | |
|---|---|---|---|---|
| Test | Specification/ Limits | Initial | HDPE bottle (Primary pack) | Clear PET bottle |
| Description | A clear colorless to light yellow color solution. | A clear colorless solution. | A clear colorless solution. | A clear colorless solution. |
| Assay of Losartan Potassium | 95.0% to 105.0% of labelled amount | 98.4 | 99.5 | 97.2 |
| Assay of Sodium benzoate | 90.0% to 110.0% of labelled amount | 99.3 | 100.3 | 98.1 |
| | | Related substances | | |
| Single maximum unknown impurity | A) Any unspecified impurity: NMT 0.2%, B) Total impurities: NMT 0.55% | BQL | BQL | 0.06 |
| Total impurities | | ND | ND | 0.06 |

*NMT—Not more than;
BQL—Below limit of quantification;
ND—Not detected

The results indicates that the final formulation was found to be stable at photostability condition.

Example 12. Freeze-Thaw Study

Freeze-thaw studies were performed at a temperature cycle of −20° C.±5° C. for 2 days followed by 40° C.±2° C. for 2 days.

TABLE 16

Results of the freeze-thaw study

| | Batch No. | Formulation B9 | |
|---|---|---|---|
| Test | Specification/ Limits | Initial | At the end of 3$^{rd}$ cycle) |
| Description | A clear colorless to light yellow color solution. | A clear colorless solution. | A clear colorless solution. |
| Assay of Losartan Potassium | 95.0% to 105.0% of labelled amount | 98.3 | 98.2 |
| Assay of Sodium benzoate | 90.0% to 110.0% of labelled amount | 98.8 | 98.5 |
| | | Related substances | |
| Single maximum unknown impurity | A) Any unspecified impurity: NMT 0.2%, B) Total impurities: NMT 0.55% | BQL | BQL |
| Total impurities | | ND | ND |

*—NMT—Not more than;
BQL—Below limit of quantification.

The results indicated that the final formulation was found to be stable at freeze-thaw conditions.

Example 13. Comparative Study of Batch B9 and Solution Compositions Disclosed in Delmarre and Kolla

TABLE 17

Comparison of batch B9 with solution compositions disclosed in examples of Delmarre and Kolla

| Ingredient | Batch B9 | Delmarre Ex. 3 | Kolla's Solution Exs. 4-5 and 10-12 | | | | |
|---|---|---|---|---|---|---|---|
| | | | Ex. 4 | Ex. 5 | Ex. 10 | Ex. 11 | Ex. 12 |
| | | | Quantity (mg/mL) | | | | |
| Losartan potassium | 10 | 12.5 | 10 | 10 | 10 | 10 | 10 |
| Preservative | Sodium Benzoate - 0.40 | — | MP & PP | MP & PP | Sodium Benzoate - 2 | MP & PP | MP & PP |
| Thickening agent | Xanthan gum - 1.50 | — | HEC | HPMC & Xanthan gum - 1 | Xanthan gum - 2.5 | — | — |
| pH Adjusting agent | — | KPB | NaOH | PB | — | PB | PB |
| Chelating agent | — | — | DSE | — | — | — | — |
| Sweetening agent | Sucralose - 1 | Saccharin sodium | Sucralose - 4 | — | Sucralos - 5 | — | — |
| Flavouring agent | Frozen Peppermint - 1 | — | — | — | — | — | — |
| Solubilising agent | PEG 400 - 115 | PG and Glycerin | — | PEG 400 - 25 & PG | — | PEG 400 - 25 & PG | — |
| Crystallization Inhibitor | — | — | — | PVP K90 & HPMC | PVP K30 | — | — |
| Vehicle | Glycerin (Q.S. to 1 mL) | Glycerin | Purified water | Purified water | Glycerin | Purified water | Water |
| pH | — | 8.2 | 6 | NR | NR | NR | NR |
| Water (% w/w) | <<≈1 | ≈12[a] | >≈90 | ≈80-90 | >≈2.4[b] | ≈80-90 | >≈90 |

Notes and Abbreviations:
[a] Delmarre's Ex. 3 solution uses aqueous potassium phosphate buffer, which serves as the source of water.
[b] Kolla's Ex. 10 solution dissolves losartan potassium in water, initially, and then adds the remaining excipients. The estimated amount of water is based on reports that losartan potassium is freely soluble in water. See Remington's, 212.
MP: Methyl Paraben; PP: Propyl Paraben; PG: Propylene glycol; PB: Phosphate Buffer; HEC: Hydroxy Ethyl Cellulose; KPB: Potassium Phosphate Buffer; DSE: Disodium edetate; HPMC: Hydroxy Propyl Methyl Cellulose (Hypromellose); NR (not reported).

Table 17 shows that Batch B9 of the non-aqueous oral solution does not contain buffering agents, pH modifiers or pH adjusting agents, parabens, chelating agents, purified water, propylene glycol, or crystallization inhibitors, hydroxypropyl methylcellulose, hydroxyethyl cellulose. Despite the absence of these excipients, the formulation remains stable, safe and effective.

This demonstrates that the non-aqueous oral solution maintains stability even in the absence of pH modifiers or buffering agents.

Example 14. Pharmacokinetic Study of Batch B9 with Respect to Reference Product (COZAAR® Tablet)

Bioavailability Study Under Fasting Condition:

An open label, balanced, randomized, two-treatment, four-period, two-sequence, single oral dose, full replicate comparative bioavailability study of losartan potassium 10 mg/mL (Administered as 100 mg/10 mL) oral solution of batch B9 was conducted with 100 mg of COZAAR® tablets in normal, healthy, adult human volunteers under fasting condition.

TABLE 18

Descriptive Statistics of Formulation Means for Losartan

| | Mean ± SD (Untransformed Data) | |
|---|---|---|
| Parameters (Units) | Test Product—T (N = 69 Observations) | Reference Product—R (N = 69 Observations) |
| $T_{max}$ (h)[#] | 0.500 (0.333-2.667) | 1.250 (0.333-5.000) |
| $C_{max}$ (ng/ml) | 806.187 ± 362.8349 | 858.961 ± 449.0213 |
| $AUC_{0-t}$ (ng · h/mL) | 1530.980 ± 948.0597 | 1664.487 ± 1068.3865 |
| $AUC_{0-\infty}$ (ng · h/mL) | 1560.022 ± 1013.3460 | 1689.837 ± 1114.6129 |
| $\lambda_Z$ (1/h) | 0.310 ± 0.1110 | 0.321 ± 0.1124 |
| $T_{1/2}$ (h) | 2.777 ± 1.7685 | 2.596 ± 1.4939 |
| AUC_% Extrap_obs (%) | 1.220 ± 1.3686 | 1.110 ± 1.2216 |
| $R^2$ adjusted | 0.990 ± 0.0117 | 0.986 ± 0.0174 |

[#]$T_{max}$ is represented as median (min-max) value

Relative Bioavailability Analysis:

Relative bioavailability analysis (i.e. geometric least squares means, ratio, 90% confidence interval, 95% upper confidence bound and power) of Test Product—T vs. Reference Product—R for losartan are summarized in the following table:

TABLE 19

Relative Bioavailability Results for Losartan

Geometric Least Squares Means

| Parameters | Test Product - T (N = 69 Observations) | Reference Product - R (N = 69 Observations) | Ratio (T/R) % | 90% Confidence Interval | 95% Upper Confidence Bound | Power (%) |
|---|---|---|---|---|---|---|
| $lnC_{max}$ | 729.456 | 755.417 | 96.6 | N/AP | −0.0568 | N/AP |
| $lnAUC_{0-t}$ | 1352.590 | 1455.594 | 92.9 | 89.19-96.81 | N/AP | 100.0 |
| $lnAUC_{0-\infty}$ | 1369.275 | 1471.837 | 93.0 | 89.32-96.90 | N/AP | 100.0 |

As per results, the test product has demonstrated bioavailable to the Reference product with respect to $C_{max}$, $AUC_{0-t}$ and $AUC_{0-\infty}$.

Bioavailability Study Under Fed Condition:

An open label, balanced, randomized, two-treatment, four-period, two-sequence, single oral dose, full replicate comparative bioavailability study of losartan potassium 10 mg/mL (Administered as 100 mg/10 mL) oral solution of batch B9 was conducted with 100 mg COZAAR® tablets in normal, healthy, adult human volunteers under fed condition.

TABLE 20

Descriptive Statistics of Formulation Means for Losartan

| Parameters (Units) | Mean ± SD (Untransformed Data) Test Product—T (N = 67 Observations) | Reference Product—R (N = 67 Observations) |
|---|---|---|
| $T_{max}$ (h)# | 1.517 (0.333-5.333) | 4.333 (0.667-6.033) |
| $C_{max}$ (ng/ml) | 391.357 ± 119.2530 | 686.390 ± 285.9055 |
| $AUC_{0-t}$ (ng · h/mL) | 1261.942 ± 332.9989 | 1379.713 ± 409.5859 |
| $AUC_{0-\infty}$ (ng · h/mL) | 1273.174 ± 336.8092 | 1393.984 ± 413.3287 |
| $\lambda_Z$ (1/h) | 0.397 ± 0.1206 | 0.390 ± 0.1315 |
| $T_{1/2}$ (h) | 1.971 ± 0.8227 | 2.034 ± 0.8537 |
| AUC_% Extrap_obs (%) | 0.871 ± 0.4207 | 1.038 ± 0.6812 |
| $R^2$ adjusted | 0.990 ± 0.0100 | 0.982 ± 0.0194 |

$T_{max}$ is represented as median (min-max) value

Relative Bioavailability Analysis:

Relative bioavailability analysis (i.e. geometric least squares means, ratio, 90% confidence interval, and power) of Test Product—T vs. Reference Product—R for losartan are summarized in the following table:

TABLE 21

Relative Bioavailability Results for Losartan

Geometric Least Squares Menas

| Parameters | Test Product—T (N = 67 Observations) | Reference Product—R (N = 67 Observations) | Ratio (T/R) % | 90% Confidence Interval | Power (%) |
|---|---|---|---|---|---|
| $lnC_{max}$ | 374.396 | 634.747 | 59.0 | 52.32-66.49 | 92.3 |
| $lnAUC_{0-t}$ | 1210.894 | 1329.911 | 91.1 | 88.46-93.72 | 100.0 |
| $lnAUC_{0-\infty}$ | 1221.448 | 1343.663 | 90.9 | 88.34-93.55 | 100.0 |

As per results, the test product has demonstrated bioavailable to the reference product with respect to $C_{max}$, $AUC_{0-t}$ and $AUC_{0-\infty}$.

Disclosed Information

COZAAR® (losartan potassium) 2.5 mg-ml Powder and Solvent for Oral Suspension, UK Prescribing Information, Merck Sharp and Dohme Limited, June 2019, 22 pp.

COZAAR® (losartan potassium) Tablets, US Prescribing Information, Organon & Co., October 2021, 19 pp.

Foley et al., *Investigation of the Physical, Chemical and Microbiological Stability of Losartan Potassium 5 mg/mL Extemporaneous Oral Liquid Suspension*, Molecules (2021), 26(2), 301, 9 pp.

Handbook of Pharmaceutical Excipients, 6th Ed. (2009), 13 pp. ("Handbook").

International Publication No. WO2009112800A1, Losartan composition, published on Sep. 17, 2009 to Tiernery, C. ("Tiernery").

International Publication No. WO2022076746A1, Losartan liquid formulations and methods of use, published on Apr. 14, 2022 to Kolla et al.

Ora-Plus® Product Information (2010), 2 pp.

Ora-Sweet® SF Product Information (2010), 2 pp.

Rahamathulla et al., *Design and Evaluation of Losartan Potassium Effervescent Floating Matrix Tablets: In Vivo X-ray Imaging and Pharmacokinetic Studies in Albino Rabbits*, Polymers (2021), 13(20), 3476, 16 pp.

Remington's: The Science and Practice of Pharmacy, Chapter 16 (in part) Solutions of Phase Equilibria, pp. 211-212, reporting that freely soluble is a descriptive term for solubility where 1 part of solute is soluble in 1-10 parts of solvent, 4 pp. ("Remington's").

U.S. Patent Application Publication No. US20070026026 A1, Oral liquid losartan compositions, published on Feb. 1, 2007 to Delmarre et al. ("Delmarre").

U.S. Pat. No. 11,890,273, Losartan liquid formulations and methods of use, to Kolla et al. ("Kolla").

U.S. Pat. No. 5,138,069, Angiotensin II receptor blocking imidazoles, issued on Aug. 11, 1992 to Carini et al. ("Carini").

U.S. Pat. No. 5,266,583, Angiotensin II antagonist, issued on Nov. 30, 1993 to Ohtawa, M. ("Ohtawa").

Subject matter disclosed herein is hereby incorporated by reference to the extent necessary to understand the subject matter disclosed herein.

We claim:

1. A ready-to-use, non-aqueous oral solution, comprising:
losartan potassium in an amount of 10 mg/ml;
a solubilizer comprising polyethylene glycol 400 in an amount of about 115 mg/mL;
a thickening agent comprising xanthan gum in an amount of about 1.5 mg/mL;
one or more pharmaceutically acceptable excipients; and
a vehicle comprising glycerin,
wherein the ready-to-use, non-aqueous oral solution has a water content of less than about 1% w/w and excludes a buffering agent a pH adjusting agent, propylene glycol, an alkyl ester of p-hydroxybenzoic acid, povidone, hydroxypropyl methylcellulose, hydroxyethyl cellulose, and saccharin sodium.

2. The oral solution of claim 1, wherein the one or more pharmaceutically acceptable excipients is selected from a preservative, a sweetener, a wetting agent, a co-solvent, a flavorant, a suspending agent, a taste masking agent, an antioxidant, a stabilizer, or any combination thereof.

3. The oral solution of claim 1, wherein the oral solution has 1.0% or less of losartan related total impurities after storage for 6 months at 40±2° C. and not more than 25%±5% RH or 25±2° C. and 60%±5% RH.

4. The oral solution of claim 1, wherein the oral solution when administered as a single dose of about 100 mg to a subject provides a T/R ratio of from about 50% to about 125%, wherein T is a $C_{max}$-value of the single dose after administration to a human, and wherein R is a $C_{max}$-value of a tablet comprising 100 mg losartan potassium after administration to the human.

5. The oral solution of claim 1, wherein the oral solution when administered as a single dose of about 100 mg to a subject under fast condition provides the following (mean±SD) pharmacokinetic parameters:

$T_{max}$ (h): 0.500 (0.333-2.667);
$C_{max}$ (ng/ml): 806.187±362.8349;
$AUC_{0-t}$ (ng·h/mL): 1530.980±948.0597;
$AUC_{0-\infty}$ (ng·h/mL): 1560.022±1013.3460; and
$T_{1/2}$ (h): 2.777±1.7685.

6. The oral solution of claim 1, wherein the oral solution when administered as a single dose of about 100 mg to a subject under fed condition provides the following (mean±SD) pharmacokinetic parameters:

$T_{max}$ (h): 1.517 (0.333-5.333);
$C_{max}$ (ng/ml): 391.357±119.2530;
$AUC_{0-t}$ (ng·h/mL): 1261.942±332.9989;
$AUC_{0-\infty}$ (ng·h/mL): 1273.174±336.8092; and
$T_{1/2}$ (h): 1.971±0.8227.

7. The oral solution of claim 1, wherein the water content is less than about 0.5% w/w.

8. The oral solution of claim 1, wherein the water content is less than about 0.2% w/w.

9. The oral solution of claim 1, wherein the water content is less than about 0.1% w/w.

10. The oral solution of claim 1, wherein a weight ratio of polyethylene glycol 400 to glycerin is from about 5:95 to about 15:85.

* * * * *